J. J. FINNEY.
VALVE.
APPLICATION FILED FEB. 4, 1918.

1,429,199.

Patented Sept. 12, 1922.
3 SHEETS—SHEET 1.

Inventor
James J. Finney
By William L. Hall Atty.

Witness

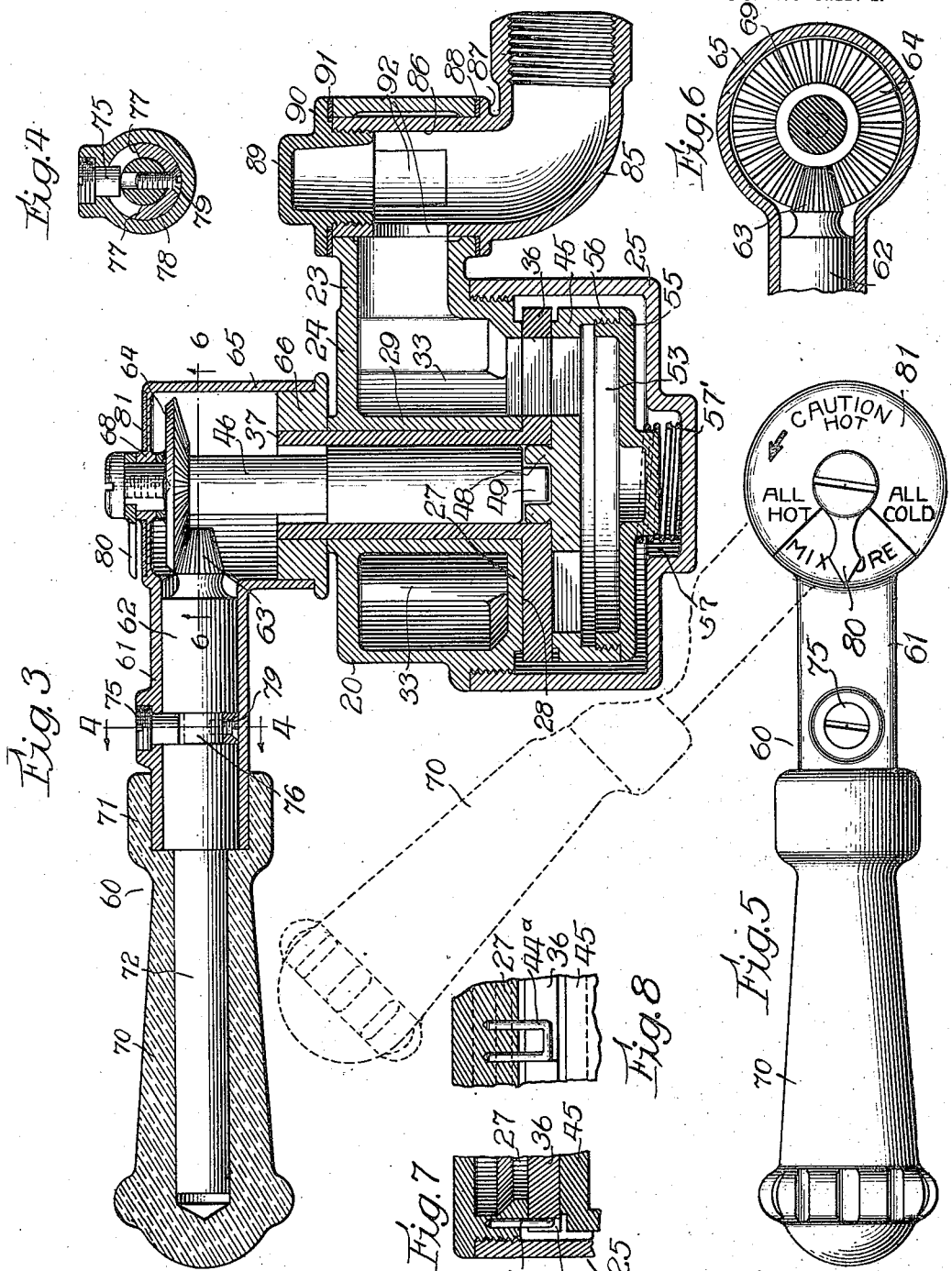

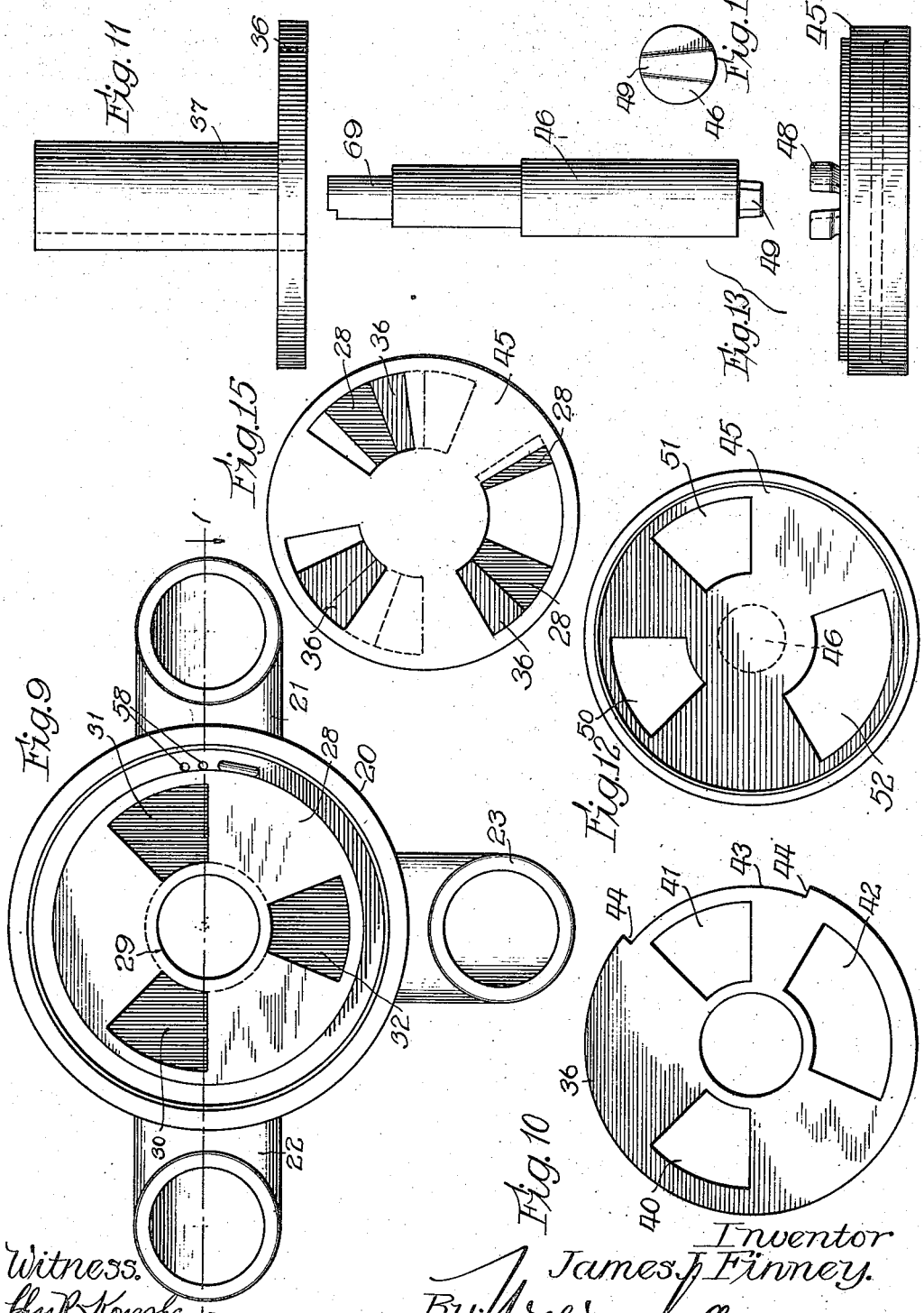

Patented Sept. 12, 1922.

1,429,199

UNITED STATES PATENT OFFICE.

JAMES J. FINNEY, OF CHICAGO, ILLINOIS, ASSIGNOR OF ONE-FOURTH TO CARL P. SCHROEDER, ONE-FOURTH TO GUSTAV F. JEDLICKA, AND ONE-FOURTH TO RAYMOND D. BLISS, ALL OF CHICAGO, ILLINOIS.

VALVE.

Application filed February 4, 1918. Serial No. 215,264.

*To all whom it may concern:*

Be it known that I, JAMES J. FINNEY, a citizen of the United States, and a resident of Chicago, in the county of Cook and State of Illinois, have invented certain new and useful Improvements in Valves; and I do hereby declare that the following is a full, clear, and exact description thereof, reference being had to the accompanying drawings, and to the characters of reference marked thereon, which form a part of this specification.

This invention relates to a novel valve structure for controlling, or regulating the mixture of fluids furnished from a plurality of sources of supply and directed to a single discharge orifice, either where the fluids be separately directed from their source of supply to the discharge orifice or where the fluids be simultaneously and in determinable proportion taken from the two sources of supply and mixed and thereafter directed to the discharge orifice or outlet.

The invention is herein shown as specifically adapted to what is known as a mixing valve, or a valve wherein the fluids which enter the valve through the inlet branches are mixed in suitable proportions to produce a predetermined fluid mixture before the mixture is discharged through the outlet orifice or branch. For instance, if the entering fluids be of different temperatures, the resultant mixture will be of a mean temperature, depending upon the proportions of the entering fluids. Said entering fluids may be differentiated by other characteristics, as, for instance, may be differentiated as to their specific gravities, or as to their chemical constituents, et cetera, to produce a resultant mixture having the desired or predetermined characteristics. The valve structure may likewise be employed to separately control fluids from sources having different temperatures or differing otherwise as to their characteristics where no mixing function is required.

Some of the features of the valve structure may be adapted to other uses within the spirit and scope of the invention in a manner which will be apparent to those skilled in the art.

An object of the invention is to provide a novel arrangement of the ported valve elements which enables the proportions of the entering fluids to be graduated as desired, while permitting a variable volume discharge from the valve, so that when used, for instance, as a mixing valve, the volume of the fluid mixture discharged from the valve may be predetermined independently of the proportions of the entering fluids which are mixed in the valve, and the proportions of the fluid in the mixture may be varied independently of the volume. Thus when used as a mixing valve to mix hot and cold water, the temperature of the discharge may be controlled independently of the volume of the liquid mixture discharged from the valve, and the volume may be controlled independently of or without varying the temperature.

Another object of the invention is to provide, in a valve mechanism having independently operable valve elements to control the volume and proportioned mixture of the fluids, a compound, manually operable controlling device so constructed as to impart independent movements to the valve elements. This feature of the valve structure is adapted to either a mixing valve where two fluids are mixed in determinable proportions and the mixture thereafter discharged, or to a valve wherein the entering fluids are separately and independently passed through the valve to the discharge outlet. The compound control may take the form of a swinging hand lever connected to and operating one of the valve elements, and embracing as a part thereof a rotatable member which is connected to and operates the other valve element and carried by the swinging lever.

Another object of the invention is to provide, in a mixing valve designed to mix fluids such as hot and cold water, means to compensate for the action of differential expansion on different parts of the valve elements, due to the contact thereof with fluids of different temperatures, and thereby avoid the tendency of the valve elements and parts associated therewith to bind. When the valve elements take the form of discs opated by central spindles or stems, this phase of the invention may be embraced in a loose connection between one of the stems and its disc which permits slight tilting of the disc relatively to the stem.

Another object of the invention is to provide an improved construction and arrangement of the relatively movable valve elements whereby a preponderance of pressure is maintained on said elements in a direction towards the valve seat to maintain the elements of the valve properly seated.

Another object of the invention is to provide an improved design permitting of an improved construction and arrangement of the various elements of the valve device which permits the same to be readily assembled and which simplifies the structure and reduces the cost of construction.

A further object of the invention is to provide a novel construction to avoid leakage of fluid from the valve, without the use of special packing means, and, in this respect the invention is capable of embodiments specifically different from that herein shown.

The invention has for its object to otherwise improve certain details and features of construction of valves, intended to increase the efficiency and desirability thereof, and the invention consists in the combination and arrangement of the parts shown in the drawings and described in the specification, and is pointed out in the appended claims.

The particular valve structure which is herein illustrated as one embodiment of the invention embraces, in combination with a casing having a ported seat wall and having interior conduits forming compartments for directing the fluid or fluids from the inlet branch or branches to the ports of the seat wall and for directing the fluid or fluids from the outlet port of the seat wall to the outlet branch, and a plurality of ported valve elements which are independently rotative to bring their ports into register with the ports of each other and with the ports of the seat wall; one of the rotative valve elements which cooperates with the ports of the seat wall having ports that control the volume of fluid passing through the valve and the other ported valve element cooperating with the ports of the volume valve element to control the quality of the fluid which passes through said valve. The former valve element may be termed the volume valve element and the other the quality valve element. In this construction it becomes practicable and convenient to nest the operating stems of the valve elements so that the stem of one valve element will rotate and have bearing in the stem of the other valve element and to thereby bring the ends of both stems into convenient access for the connection thereto of the compound manual control device heretofore mentioned. So far as certain features of the invention are concerned, the valve elements may assume other forms than herein shown, and be otherwise connected to their operating members.

Reference herein made to rotative valve elements is not intended to indicate that the elements are completely rotative about their axes, but have definite angular movements about their axes to produce the results desired.

In said drawings,

Figure 3 is an axial section of the valve.

Figure 4 is a detail section on the line 4—4 of Figure 3.

Figure 5 is a plan view of the operating hand lever and associated parts.

Figure 6 is a sectional view on the line 6—6 of Figure 3, looking upwardly.

Figures 7 and 8 are sectional details of a stop device for one of the valve elements.

Figure 9 is an end view of the main body of the valve casing, with the end cap and elbow unions removed and showing the body seat.

Figure 10 is a bottom view of the main valve element for controlling volume discharge.

Figure 11 is a side elevation of the latter.

Figure 12 is a bottom view of the valve element which controls the mixture of the fluids.

Figure 13 is a side elevation of the latter valve element and its operating stem.

Figure 14 is an end view of said stem.

Figure 15 is a composite view showing both valve elements in their relation to each other and to the body seat.

Figure 2:
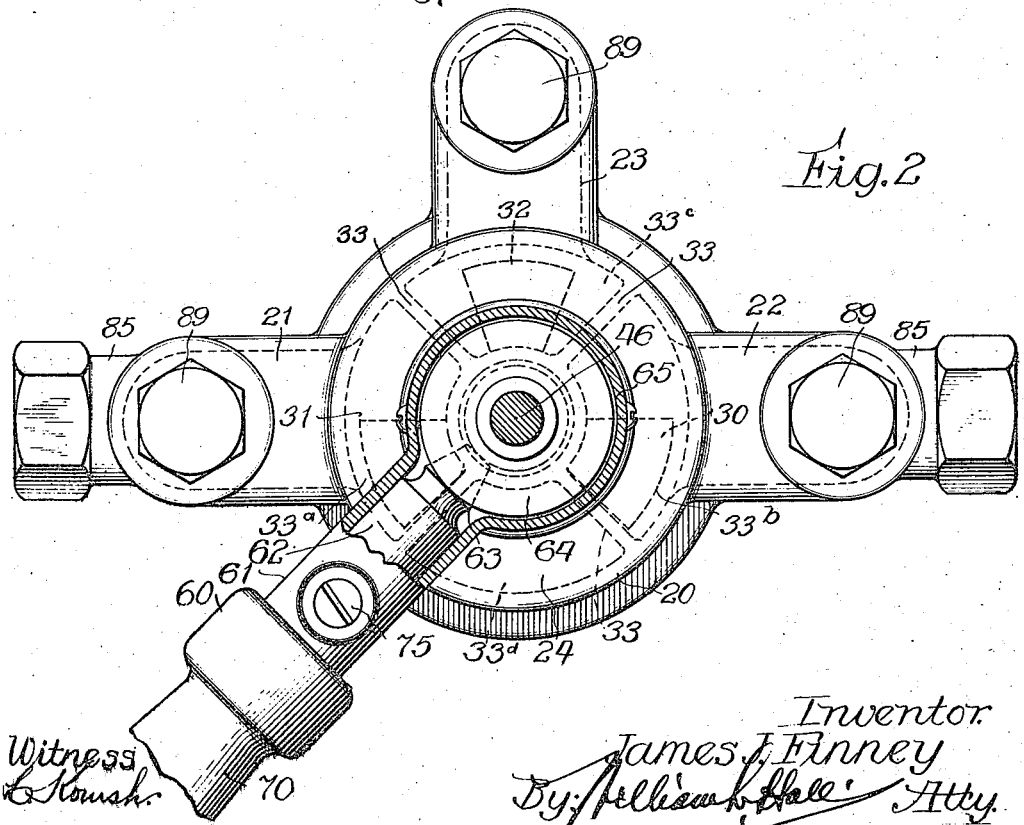
Figure 2 is an end view of the valve, with parts broken away.

The valve casing comprises a main hollow body or casting 20 provided with two inlet branches 21, 22 and a discharge branch 23. The casing is closed at one end by a wall 24 and the other end of the casing consists of a removable cap 25 that is threaded to the main body of the casing. Said main body of the casing terminates in a wall 27 forming, on one side, a seat 28. A sleeve 29 extends between and is integral with the seat wall 27 and end wall 24. The valve chamber between said seat and end walls is divided by radial partitions or walls 33 into a plurality of chambers $33^a$, $33^d$, $33^c$, $33^b$, three of which, respectively, open into the intake and discharge branches, as best shown in Figure 2, and one of which, as shown, is a dead chamber. The seat wall is pierced with three ports 30, 31, 32, herein shown as of general fan shape, the first two ports being respectively connected to or associated with the branches 22 and 21 and with the valve chambers $33^a$, $33^b$, respectively, the last designated port being connected to the discharge branch 23 and associated with the valve chamber $33^c$.

At one side of the seat wall 27, and engaging the seat 28 is a main rotative valve element 36, herein shown as of disc form.

It is provided with an axial, tubular stem 37 which extends through the central sleeve 29 of the valve casing and beyond the end wall 24. The main valve element 36 is provided with three fan shaped ports 40, 41, 42 (Figure 10), the port 40 being adapted, upon rotation of the valve element, to register with the port 30 of the seat wall; the port 41 to register with the seat wall port 31 and the port 42 to register with the outlet port 32 of said seat wall.

In order to limit the rotation of the valve element 36, said valve element is cut away to provide a marginal notch 43, forming at the ends thereof stop shoulders 44 which are angularly spaced a distance somewhat greater than the angular movement of said valve element. Depending from the valve body radially exterior to the seat member or wall 27 is a stop member 44ª (Figures 7 and 8) which enters said notch and is adapted, by engagement with said shoulders, to limit rotation of the valve element. In order to afford the required strength or sturdiness of the stop member 44ª, it is shown as having the form of a staple, the legs of which are forced into openings in the valve body, and said staple is so presented to the shoulders 44, 44 that one shoulder strikes one leg of the staple and the other shoulder the other leg thereof.

Beyond said main valve element 36 is a second rotative valve element 45 which seats against the outer face of the main valve element 36. Said valve element 45 is actuated by an axially disposed stem 46 which is connected at its inner end to said valve element and extends outwardly through and has bearing in the hollow stem 37 of the main valve element. As herein shown, and preferably, when the valve structure is adapted as a mixing valve, the rotative valve element 45 is loosely connected to its operating stem so that said valve element may tip slightly relatively to its stem and thereby enable the valve element to adjust itself when it is subjected at diametrically opposite points to differential expansion, due to simultaneous contact therewith of hot and cold liquids, thereby avoiding tendency of the valve element to bind. Such loose connection may be afforded by providing the valve element 45 with an axial socket piece 48 and providing the stem 46 with a reduced extension 49 which fits loosely in said socket piece. In order that the valve element may be assembled always with the ports of said element, hereinafter to be mentioned, in fixed relation to the said stem 46, the said extension and the cavity of the socket piece are shown as of tapered or wedge shape in cross section.

The said valve element 45 is provided with three ports 50, 51, 52, which are adapted to respectively register with the ports 40, 41, 42 of the valve element 36. The valve element 45 is a hollow element to provide a passage 53 to connect the ports 50, 51, 52 and to prevent commingling of the fluid passing through the valve with a body of counterbalancing fluid which is by-passed against the outer end of the valve, as hereinafter described. It is preferably made of two parts, comprising an end hollow plug member 55 which is threaded to a flanged portion 56 of the main body of the valve element.

The said valve elements 36 and 45 are of less diameter than the end cap member 25 of the valve casing, and the plug 55 of the valve element 45 terminates short of the end wall of said cap member 25, to provide between said cap member and the valve elements a pressure chamber 57 for the purpose of maintaining the valve parts seated. Said chamber is in communication with one of the inlet branches, the branch 22, as herein shown, through one or more by-pass ports 58. In lieu of said pressure chamber other means to maintain the valve parts seated may be employed.

Figure 1:
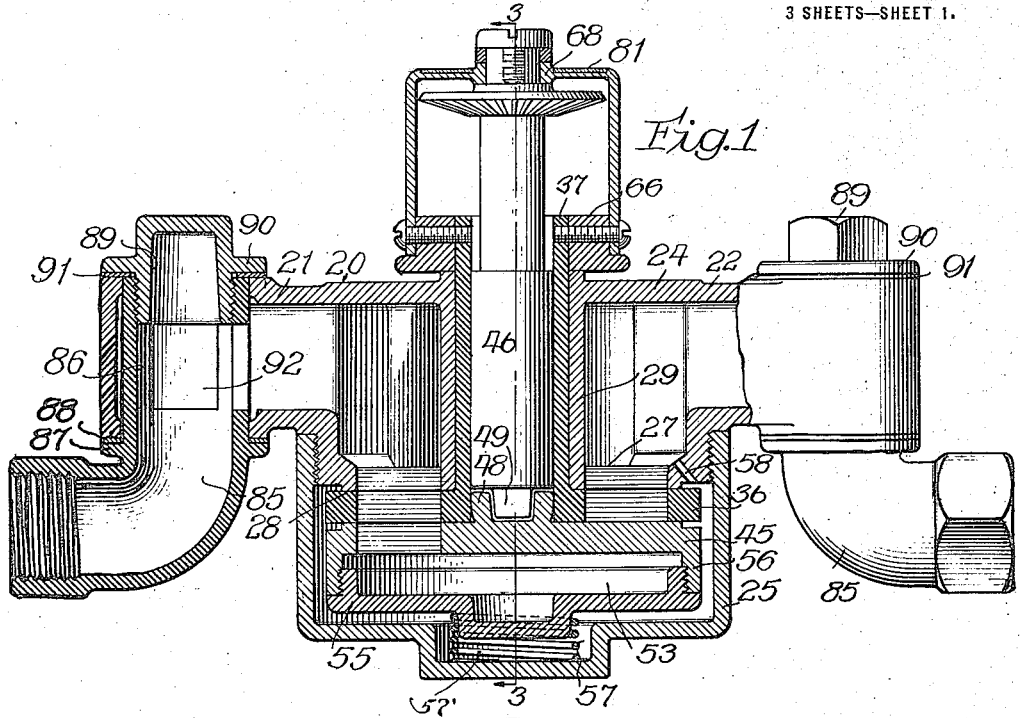
Figure 1 is an axial section of a valve embodying my invention, taken on the line 1—1 of Figure 9.

The stems 37 and 46 of the valve elements 36 and 45, respectively, extend beyond the end wall 24 of the casing for connection to a compound manual operating device, designated as a whole by 60, it comprising a swinging lever 61 which is connected to the stem 37 to rotate it, and a rotating member or shaft 62 enclosed by and having bearing in the swinging lever and connected to the valve element stem 46 by a bevel pinion 63 on said shaft 62 and a beveled gear 64 on the stem 46. The connection between the swinging lever 61 of the operating device and the hollow stem 37 of the valve element 36 comprises a housing 65, preferably shaped to enclose said pinion and gear, and which may be made integral with the lever. Said housing fits at its inner open end over a bushing 66 that surrounds and is fixed to said stem 37, as by the screw shown in Figure 1 and is provided in its outer end wall with a central boss 68 in which the reduced outer end 69 of the valve element stem 46 is rotatively mounted. The said operating device terminates in a hand piece 70 which has an enlarged inner hollowed end 71 that fits over and is rotatively mounted on the outer end of the hollow lever 61; and said rotative member or shaft 62 is provided with a reduced extension 72 which extends into an axial bore of the hand piece and is non-rotative therein in any suitable manner, as by cementing the parts together.

With this construction it will be understood that when the operating device is swung about the axis of the hollow stem 37, the main valve element 36 is operated to bring its ports into and out of register with the seat wall ports, depending upon the direction of rotation of the valve element.

When the valve element 45 is to be operated relatively to the valve element 36, the hand piece 70 is rotated, thereby rotating the shaft 62 and transmitting, through the pinion 63 and gear 64, rotative movement to the stem 46 and said valve element 45. Thus the valve elements 36 and 45 are adapted to be independently operated to perform their respective volume and quality varying functions.

Rotation of said shaft 62 and consequent rotation of the valve element 45 may be limited by any suitable form of interacting stops thereon and on the lever 61. As herein shown, such rotative movement is limited by a stud 75 which is threaded through an opening in the hollow lever 61 and which enters an annular recess or groove 76 in the shaft 62 for contact with angularly spaced stop shoulders 77 (Figure 4) that rotate with said shaft 62. Said stop shoulders are herein shown as formed on a segmental member 78 which partially surrounds the reduced portion of the shaft 62 in said groove 76 and is attached thereto by means of a countersunk screw 79.

Preferably, an indicating device or hand 80 is associated with the mixing valve element so as to indicate on a dial 81 exterior to the valve the position of the mixing valve. As herein shown, said dial 81 is supported on the housing 65 that connects the operating lever 61 to the valve element stem 46 and the indicating pointer 80 is attached to and rotates with the stem 46 above said dial.

Assuming the valve device to be used to mix hot and cold water, the dial may be graduated to indicate "All hot," "All cold" and "Mixture" areas over which the indicating device or pointer 80 sweeps. In order that the person using the valve may not carelessly open the valve to its "All hot" position the dial may bear a caution legend, as shown in Figure 5.

Unions are provided for connecting the valve to fixed pipes, the connections being such as to enable the valve casing to be removed from the fixed pipe lines by the very simple expedient of removing simple screw nuts or plugs, and by means which avoid the use or presence of special unions.

As herein shown, each of the branches is transversely bored to receive a union fitting 85, shown as an elbow fitting. The lateral arm of each fitting is threaded to receive a pipe, and the other end of the fitting is provided with a straight portion 86 which extends through and fits in the transverse opening of the branch. Said fitting is provided at the base of said straight portion 86 with a flange 87, between which and a coacting face of the branch is interposed a packing 88. The other end of the fitting is interiorly screw threaded to receive an exteriorly screw threaded hollow coupling plug 89, said plug being provided with a flange 90 that overlaps the branch around its through opening. Between said flange 90 and a seat on said branch is interposed a packing 91. The straight portions of the fittings are provided with one or more ports 92 for communication with the inlet and outlet branches.

The fittings described permit the ends of the elbows to be turned in any desired direction for connection to pipes, if an elbow union fitting be employed, thereby facilitating the installation of a valve to a fixed installation of pipes. Moreover, it will be observed that by simply unscrewing the coupling plugs 89 from the fittings the valve casing may be moved directly away therefrom and the casing is so shaped as to clear in all of its parts the fixed pipe connections. This arrangement of the connections avoids the use of special packing unions to produce joints that are required to be separated when the valve casing is to be removed. The construction is especially advantageous in installations wherein the principal part of the valve casing is concealed within a wall behind a removable plate that has an opening through which the forward smaller end of the valve extends. In such installations the special union fittings referred to are of inconvenient access. In the present arrangement the plugs 89 would be located immediately at the wall opening and the removal of the three plugs is all that is necessary to effect said disconnection of the casing.

It will be observed that the inlet ports 40, 41 of the main valve element are of the same dimensions as the seat ports 30, 31 and are angularly spaced the same distance apart, while the outlet port 42 of the main valve element is considerably longer than the seat outlet port 32, and the port 42 is located to always overlap the port 32 so that the outlet port is always open. Consequently when the hot and cold water ports 40, 41 are moved toward registration with the seat ports, by rotation of the main valve element, the cold water port begins to open simultaneously with the opening of the hot water port and both ports continue to open to like extent. The main valve ports, therefore, in all positions of adjustment, when open, are capable of admitting equal volumes of the hot and cold water therethrough. The valve element 36, therefore, controls volume discharge.

It will be noted, furthermore, by comparison of Figures 10 and 12, and an inspection of Figure 15, that the mixing valve element ports 50, 51 are angularly spaced at such distance that when one of the ports 50, 51 is in full register with its associate main valve element port 40, 41, and the port, therefore, full open, the other mixing valve port is closed and vice versa. From this arrangement it follows that when the valve element 45 is turned, one port thereof will be gradually opened as the other port is gradually closed, and that the inlet areas of the ports of the mixing valve element are equal only when both ports are half closed. Therefore, the flow of water through one inlet port of the mixing valve element will always be disproportional to the flow through the other inlet port, except when both ports are half open. The length of the outer port 52 of the mixing valve element insures this port to be always open.

In the operation, either of the valve elements may be primarily adjusted as desired. Assuming that the main or volume valve element is first to be adjusted, this adjustment is effected by swinging the lever 61 from the dotted to the full line position shown in Figure 5, which will open the cold and hot water ports to an equal extent until the required opening is attained to produce the desired volume. The opening of these ports regulates the volume of water passing through the valve. Thereafter the mixing valve is operated by rotating the hand piece 70 so as to thereby rotate the valve element 45 independently of and relatively to the valve element 36, and thus proportion the amount of cold and hot water which passes through the valve. For instance, in the extreme movement of the mixing valve, either hot or cold water alone may be passed through the valve, and in intermediate adjustments the temperature will be regulated according to the proportionate inflow of water from both sides of the valve.

The pointer 80 indicates on the dial 81 the position of the mixing valve, and when mixing hot and cold water and, knowing the temperatures of the entering waters, the position of said pointer on said dial will indicate to the user the temperature of the resultant mixture which he may expect. When dealing with two liquids of predetermined temperatures or other liquids having other predetermined characteristics to be mixed, it will be practicable to first adjust the mixing valve before opening the main or volume valve.

A feature of the valve structure described to be noted is that the valve elements are so constructed and assembled with respect to each other and to the casing as to render unnecessary special packing means to avoid leakage of fluid from the valve around the valve stems. Thus, the metal to metal contact or bearing faces between the inner face of the main or volume valve 36 and the casing at the base of the bearing sleeve 29 are so fitted as to prevent leakage of fluid therebetween; and the inner face of the proportioning valve 45 is also fitted in metal to metal contact against the base of the hollow stem 37 of the main valve to produce a like fluid tight joint. It will also be observed that the unbalanced pressure on the valve elements acts in a direction to maintain the bearing or packing faces in contact and serves to maintain said parts in good packing contact notwithstanding slight wear of the bearing or packing faces. The length of the reduced portion 49 of the stem 46 is such, relatively to the distance between the member 55 and the end of the cap 25 that, in the event of failure of pressure in the pressure chamber, the said extension 49 will not become detached from the part 48 of the valve 45, whereupon upon the restitution of pressure in said chamber the valves are and will remain coaxial. If desired, the said valve elements may be held against their seats by mechanical means, as the spring 57', shown in Figures 2 and 3. However, when the valve is used as a mixing valve for hot and cold water the branch 22 will be connected to the cold water pipe, inasmuch as the cold water enters the valve at a pressure greater than that of the hot water, and such pressure will be maintained because in the natural use of the mixing valve the volume of the cold water will predominate that of the hot water.

While the specific embodiment of the invention illustrated has been described with considerable particularity, it will be understood that the invention is not limited to the structural details shown, except as to claims wherein said details are specifically set forth and as imposed by the prior art.

What I claim is:

1. A valve structure for fluids comprising a casing having a plurality of inlet passages, and an outlet passage, with means to control said passages, embracing a ported body seat, a ported volume valve element coacting therewith, and a ported inlet proportioning valve element coacting with and operable independently of said volume valve element, and means to operate said valve elements, said valve elements being coaxially disposed, and angularly displaceable about a common, extended axis.

2. A valve structure for fluids comprising means to provide two inlet passages leading to a common discharge passage, volume and proportioning valve elements angularly movable to operative positions and coaxial with respect to each other to control said passages, and separately operable manual means to operate said valve elements.

3. A valve structure for fluids comprising a casing provided with two inlet passages, with a discharge passage and with a ported seat, two rotative ported valve elements which are angularly displaceable about a common axis, one of said valve elements being adapted to be adjusted relatively to the other; and said valve elements being arranged to coact with each other and with said ported seat, and a single compound hand device constructed with means to actuate said valve elements to variably control fluid flow through said inlet passages, and to variably control discharge from said discharge passage.

4. A valve structure for fluids comprising a casing having a plurality of inlet passages, a discharge passage, and a ported seat, a rotative ported volume discharge valve element and a rotative ported proportioning valve element coaxial with each other and said seat, said valve elements coacting with each other and with said seat to control said passages.

5. A valve structure for fluids comprising a casing having a plurality of inlet passages, and a discharge passage, with a ported volume discharge valve element and a ported proportioning valve element coacting with each other and with a ported seat to control said passages, and a compound unitary operating hand piece embracing two elements and operable at will.

6. A valve structure for fluids comprising a casing having a plurality of inlet passages and a discharge passage, with valve elements to control said passages, constructed with ports to control fluid volume discharge and with other ports to control proportional fluid flow through the inlet passages, a swinging hand lever connected to one of said valve elements, and a member operatively connected to the other valve element and rotatively mounted in said swinging hand lever.

7. A valve structure for fluids comprising a casing having means to provide an outlet passage and a plurality of inlet passages, a valve element to control the volume discharge to said outlet passage, a valve element to proportionately control the fluid flow from said inlet passages to said outlet passage, a swinging hand lever directly connected to one of said valve elements and a rotative member having rotative bearing in said lever, with gear means to connect it to the other valve element.

8. A valve structure for fluids comprising a casing having two inlets and a common discharge, a ported seat, a ported main or volume element coacting with said seat, a ported proportioning valve element seated on the main or volume valve element, and means to actuate said valve elements to separately control volume and proportioning flow through the valve.

9. A valve structure for fluids comprising a casing having two inlet passages, a common outlet passage, and a ported seat, with a volume valve element coacting with said seat, and a ported proportioning valve element seated on the volume valve element, said valve elements each being provided with a stem, one of which is hollow and has a bearing in the casing, and the other of which extends through the hollow stem, said stems extending beyond the valve casing for connection to actuating means.

10. A valve structure for fluids comprising a casing with a plurality of inlets, a common outlet and a ported seat, a rotative, ported volume valve element coacting with said seat, with means to operate it, and a rotative, ported proportioning valve element seated against the volume valve element and provided with a central operating stem, there being a loose connection between the latter valve element and its stem to compensate for differential expansion due to contact therewith of hot and cold fluids.

11. A valve structure for fluids comprising a casing having two inlet ports, a common outlet port and a ported seat, a volume valve element coacting with said seat, and a ported, proportioning valve element seated on the volume valve element, said valve elements each being provided with a stem, one of which is hollow and has a bearing in the casing, and the other of which extends through the hollow stem, said stems extending beyond the valve casing for connection to actuating means, there being a loose connection between the latter valve element and its stem to compensate for differential expansion due to contact therewith of hot and cold fluids.

12. A valve structure for fluids comprising a casing having two inlets, a common discharge and a seat having ports, associated one with each inlet and one with the discharge, with interior partitions to subdivide the casing between said ports, a ported volume valve element coacting with said seat, and a ported proportioning valve element seated on the volume valve element, said latter valve element having a passage to connect its ports.

13. A valve structure for fluids comprising a casing having two inlets, a common discharge and a seat having ports, associated one with each inlet and one with the discharge, with interior partitions to subdivide the casing between said ports, a ported main or volume valve element coacting with said seat, and a ported proportioning valve element seated on the main or volume valve element, said proportioning valve element being provided within the casing with a balancing pressure area, with means to by-pass fluid from one of the inlets against said pressure area.

14. A valve structure for fluids comprising a casing having a plurality of inlets and a common outlet, with means to control said passages, embracing a ported body seat, a rotatable, ported volume valve element coacting therewith and a ported inlet proportioning valve element coacting with said volume valve element and operable independently thereof, and means to operate said valve elements at will, said proportioning valve element being subjected on one side to the pressure of one of the inlet passages.

15. A valve structure for fluids comprising a casing having a plurality of inlet passages and a common outlet passage, with means to control said passages, embracing a ported body seat, a ported volume valve element coacting therewith, a ported inlet proportioning valve element coacting with said volume element and operable independently thereof, said valve elements being angularly movable on a common axis, means to operate said valve elements at will, and stops to separately limit the movements of said valve elements.

16. A valve structure for fluids comprising a casing having a plurality of inlet passages and an outlet passage, with means to control said passages, embracing a ported body seat, a ported volume discharge valve element coacting therewith, and a ported inlet proportioning valve element coacting with said volume discharge valve element, said valve elements being provided with axially disposed operating stems, one having bearing in the other, a swinging lever connected to one of said stems to operate it, a rotative shaft mounted in said lever and geared to the other stem, and stop means associated with said rotative shaft for limiting the angular movement of the proportioning valve.

17. A valve structure for fluids comprising a casing having a plurality of inlet passages and a common outlet passage, with means to control said passages, embracing a ported body seat, a ported volume discharge valve element coacting therewith, a ported inlet proportional valve element coacting with said volume discharge element, said valve elements being angularly movable on a common axis, means to operate said valve elements at will to separately control fluid discharge, and stop means for said volume discharge valve.

18. A valve for fluids comprising a casing having inlet passages and a common outlet passage and a seat, a rotative volume valve element coacting with said seat and provided with a central hollow operating stem having bearing in said casing, and a rotative proportioning valve element seated on the main or volume valve element and having a central stem which has bearing in the hollow volume valve element stem, said volume and proportioning valve elements having metal to metal contact with packing faces at the bases of said stems to provide packing bearings to prevent escape of fluid from the valve.

19. A valve for fluids comprising a casing having two inlet passages and a common outlet passage and a seat, a rotative volume valve element coacting with said seat and provided with a central hollow operating stem having bearing in said casing, and a rotative proportioning valve element seated on the main or volume valve element and having a central stem which has bearing in the hollow volume valve element stem, said volume and proportioning valve elements having metal to metal contact with packing faces at the bases of said stems to provide packing bearings to prevent escape of fluid from the valve, said valve elements being subjected at one side to the pressure of one of said inlet passages to force both said valve elements against their packing bearings.

20. A valve structure for fluids comprising a casing provided with an outlet and with a plurality of inlets and provided with a ported seat, two valve elements, coaxial with each other and with said seat, one coacting with the seat and arranged with ports to control volume discharge, and the other coacting with the first valve element and arranged with ports to control the proportional inflow, and means whereby the valve elements are held against their seats.

21. A valve structure for fluids comprising a casing provided with an outlet and with a plurality of inlets and a ported seat, two valve elements, one coacting with the seat and arranged with ports to control volume discharge and the other coacting with the first valve element and arranged with ports to control proportional inflow, said valve elements being coaxially disposed and capable of independent adjustment, with means to adjust them, and means to direct fluid against a pressure area of the valve elements in a direction to hold them against their seats.

In testimony whereof I claim the foregoing as my invention, I hereunto append my signature at Chicago, Illinois, this 26 day of Jany., 1918.

JAMES J. FINNEY.